Patented May 28, 1929.

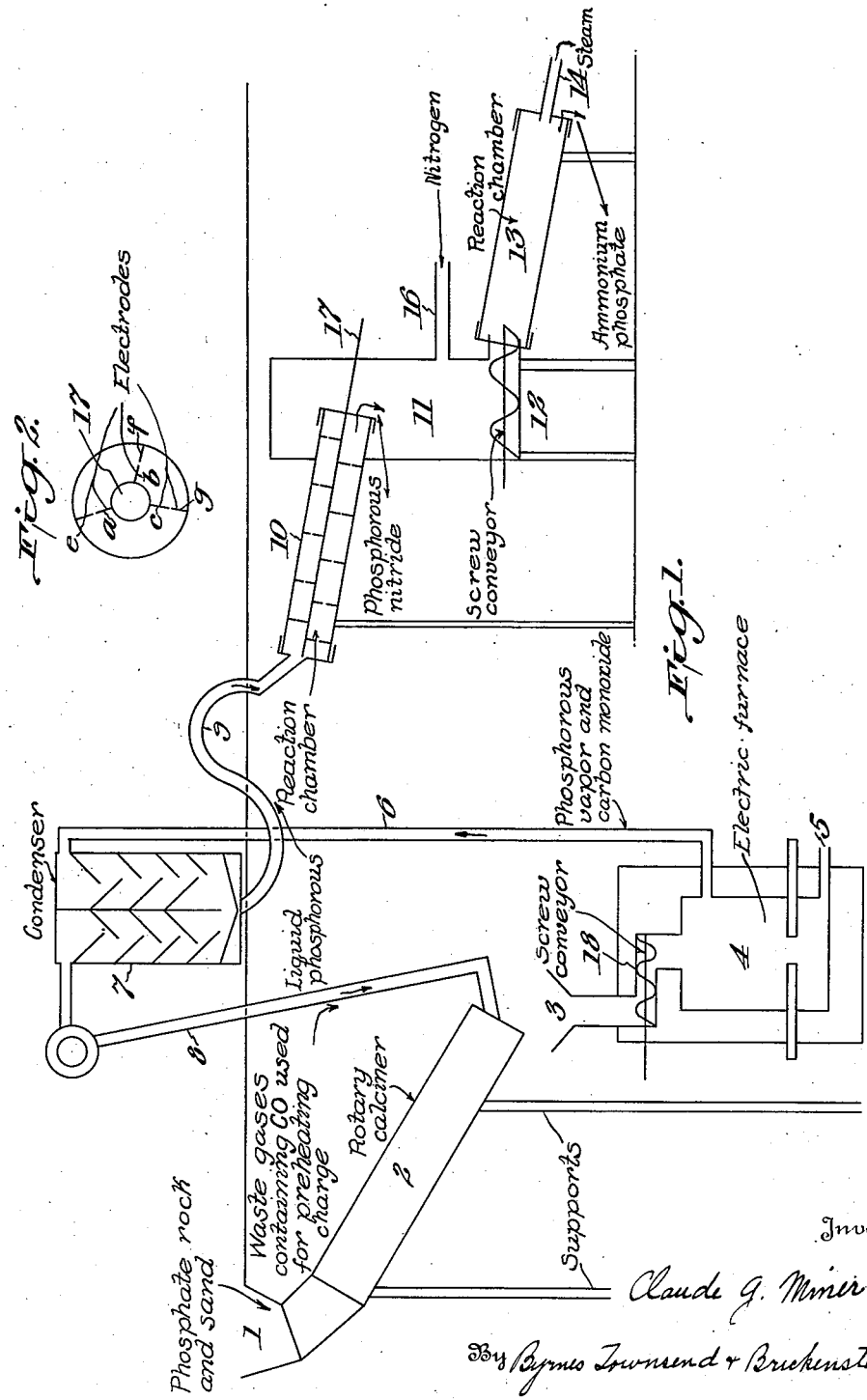

1,715,041

UNITED STATES PATENT OFFICE.

CLAUDE G. MINER, OF BERKELEY, CALIFORNIA.

PROCESS OF MAKING PHOSPHORUS NITRIDE.

Application filed November 6, 1922. Serial No. 599,459.

This invention relates to a method of treating phosphorus bearing ores to obtain phosphorous and then causing the phosphorus to unite with nitrogen from the air, thus giving phosphorus nitride which can, if desired, be treated with steam at an elevated temperature to give ammonium phosphate.

Phosphorus is an expensive element of soil fertility and one that is deficient in large areas of soil. At present, where raw phosphate rock is treated with sulphuric acid to give the more soluble acid phosphate rock, the actual phosphorus content of the product is only about 15 percent. The rest is essentially waste material upon which freight, handling charges, etc., must be paid.

About the same conditions exist with regard to nitrogen fertilizers. The standard nitrogen fertilizers contain about 16 to 21 percent of nitrogen, the rest being essentially waste material which involves additional transportation and handling charges.

This invention gives a process whereby a more highly concentrated fertilizer containing these elements (nitrogen and phosphorus) can be manufactured, and the transportation and handling charges thereby greatly reduced.

In the manufacture of the fertilizer itself, the present process has many advantages over other existent processes for the fixation of nitrogen. From start to finished product, either phosphorus nitride or ammonium phosphate, the process is continuous. This feature makes possible a great saving in labor costs. Standard working conditions are also a feature of this process; for instance, the process does not employ excessive pressures or temperatures. The machinery is essentially standard, now being utilized for other purposes.

The present invention therefore contemplates the formation of a phosphorus nitride, which is a condensed fertilizer, being gradually decomposed in the soil into forms that can be assimilated by plant life. If it is desired to obtain a form immediately soluble, then the nitride is treated with steam at an elevated temperature to give ammonium phosphate.

The first step of the process is the treatment of phosphate rock by any standard method for the production of phosphorus. The resulting vapors of phosphorus and oxides of carbon are passed into a condenser where the phosphorus preferably is condensed to a liquid state. The liquid phosphorus is passed into a reaction chamber, into which nitrogen, as pure as possible, is admitted. To facilitate the reaction between the nitrogen and phosphorus an energetic electrical discharge or a catalyst is used in the reaction chamber, where nitride of phosphorus is formed. A high tension arc of low amperage or a static electrical discharge is suitable. The reaction chamber preferably is maintained at a temperature above the boiling point of phosphorus but below a red heat. In the presence of an energetic electrical discharge the reaction is active and rapid. A large induction coil used in laboratory tests also gave very good results. Catalytic agents also cause the reaction to take place, but I prefer an energetic electrical discharge. Iron, nickel, platinized asbestos, finely divided magnesium, etc., make good catalysts for the reaction. The phosphorus nitride is a grayish amorphous material which is non-hygroscopic and stable at ordinary temperatures. At high temperatures, however, it is a powerful reducing agent and burns in the air, hence the nitride must be cooled in an inert atmosphere such as nitrogen gas. If it is desired to make ammonium phosphate, the nitride is allowed to pass into another chamber or into another part of the same chamber, where the temperature is maintained at from 180°–200° C. In to this chamber is passed steam which with the phosphorus nitride at 180°–200° C. gives ammonium phosphate of a non-hygroscopic character.

The accompanying drawings illustrate diagrammatically one arrangement of apparatus suitable for the carrying out of the process of my invention.

On the drawings,

Fig. 1 is a vertical sectional view of the complete plant, and

Fig. 2 is a cross-sectional view of the reaction chamber 10 of Fig. 1.

The process is carried out in the apparatus illustrated as follows:

Phosphate rock and sand are fed from the hopper 1 into the rotary calciner 2, where the mixture is preheated by means of waste gases from the condenser 7. From the rotary calciner 2 the hot mixture of sand and phosphate rock passes into the electric furnace 4 by way of the hopper 3 and the screw conveyor 18. Coke in proper proportion is mixed with the sand and phosphate rock as it passes from the calciner 2 to the furnace 4. The phosphorus vapor and carbon monoxide formed in the furnace 4 pass through the conduit 6 to the condenser 7. In the condenser 7 the phosphorus is condensed to a liquid state and collects in the bottom of the condenser. The carbon monoxide is conveyed through the conduit 8 to the calciner 2 where it is used to preheat the sand and phosphate rock. Slag formed in the furnace 4 is drawn off at 5. The phosphorus collected in the condenser 7 passes through the trap 9 into the reaction chamber 10. The reaction chamber 10 can be made of iron lined with brick. Electrodes $e$, $f$ and $g$ project from the inner walls of the reaction chamber 10. Within the reaction chamber 10 is a rotary shaft 17 carrying the radial electrodes, $a$, $b$ and $c$. As the shaft 17 rotates in a direction opposite to the direction of rotation of the chamber 10, electrodes $a$, $b$ and $c$ pass close to electrodes $e$, $f$ and $g$, giving high tension arcs of low amperage which cause a rapid reaction between the phosphorus and nitrogen, the latter being supplied through conduit 16, forming nitride of phosphorus. The nitride passes into a chamber 11 where it cools in an atmosphere of nitrogen. If it is desired to make ammonium phosphate, the nitride is conveyed by a screw device 12 into another chamber 13 where it is brought into contact with steam at a temperature of about 180–200° C. introduced through the pipe 14. This gives ammonium phosphate. Thus the process produces a complete continuous procedure for the manufacture of either phosphorus nitride or ammonium phosphate with a moderate consumption of power and low labor costs.

The process takes about two volumes of nitrogen to one volume of phosphorus vapor. If ammonium phosphate is formed in the conduit 8 just enough steam is admitted to form an anhydrous ammonium phosphate. The ratios in which the phosphate rock, sand and coke are mixed are in accordance with standard practice for the manufacture of phosphorus.

It is naturally possible for one skilled in the art to vary the details of the above procedure as well as the proportions of the different ingredients, kind of catalyst, etc., without departing from the spirit of the invention. Therefore I do not wish to be limited to the above disclosure except as may be required by the claims.

Having thus described my invention, what I claim and desire to secure by Letters Patent is:—

1. The process of producing phosphorus nitride which consists in bringing phosphorus and nitrogen together in proper proportion in a reaction chamber at a temperature above the boiling point of phosphorus but below a red heat.

2. The process of producing phosphorus nitride which consists in bringing phosphorus and nitrogen together in proper proportion in a reaction chamber at an elevated temperature, and then cooling said nitride in an inert atmosphere.

3. The process of producing phosphorus nitride which consists in bringing together phosphorus and nitrogen in proper proportion in a reaction chamber in the presence of an energetic electric discharge.

4. The process of producing phosphorus nitride which consists in bringing together phosphorus and nitrogen in a reaction chamber in proper proportion in the presence of an energetic electric discharge at an elevated temperature.

5. The process of producing phosphorus nitride which consists in bringing together phosphorus and nitrogen in a reaction chamber in proper proportion in the presence of an energetic electric discharge above the boiling point of phosphorus but below a red heat.

6. The process of producing phosphorus nitride which consists in bringing together phosphorus and nitrogen in proper proportion in a reaction chamber in the presence of a high tension arc at an elevated temperature.

7. The process of producing phosphorus nitride which consists in bringing together phosphorus and nitrogen in proper proportion in a reaction chamber in the presence of a high tension arc above the boiling point of phosphorus but below a red heat.

8. The process of producing phosphorus nitride which consists in bringing together phosphorus and nitrogen in proper proportion in a reaction chamber in the presence of an energetic electrical discharge at an elevated temperature, and then cooling the nitride in an inert atmosphere.

9. The process of producing phosphorus nitride which consists in bringing together phosphorus and nitrogen in proper proportion in a reaction chamber in the presence of an energetic electrical discharge at an elevated temperature, and then cooling the nitride in an inert atmosphere of nitrogen.

Signed at Berkeley in the county of Alameda and State of California this 1st day of Aug., 1922.

CLAUDE G. MINER.